(12) United States Patent
Bregler et al.

(10) Patent No.: US 11,093,443 B2
(45) Date of Patent: Aug. 17, 2021

(54) DATABASE-LEVEL CONTAINER GROUP MANAGEMENT

(71) Applicant: SAP SE, Walldorf (DE)

(72) Inventors: Jonathan Bregler, Kraichtal (DE);
Alexander Bunte, Heidelberg (DE);
Arne Harren, Walldorf (DE); Andreas Kellner, Birkenau-Löhrbach (DE);
Daniel Kuntze, Bruchsal (DE); Simon Lueders, Walldorf (DE); Volker Sauermann, Dossenheim (DE);
Michael Schnaubelt, Leimen (DE);
Le-Huan Stefan Tran, Malsch (DE)

(73) Assignee: SAP SE, Walldorf (DE)

( * ) Notice: Subject to any disclaimer, the term of this patent is extended or adjusted under 35 U.S.C. 154(b) by 76 days.

(21) Appl. No.: 15/637,531

(22) Filed: Jun. 29, 2017

(65) Prior Publication Data
US 2019/0005054 A1    Jan. 3, 2019

(51) Int. Cl.
| | | |
|---|---|---|
| *G06F 16/11* | (2019.01) | |
| *G06F 9/445* | (2018.01) | |
| *G06F 8/70* | (2018.01) | |
| *G06F 8/60* | (2018.01) | |
| *G06F 16/28* | (2019.01) | |
| *G06F 16/21* | (2019.01) | |

(52) U.S. Cl.
CPC ............. *G06F 16/122* (2019.01); *G06F 8/60* (2013.01); *G06F 8/70* (2013.01); *G06F 9/445* (2013.01); *G06F 16/21* (2019.01); *G06F 16/285* (2019.01)

(58) Field of Classification Search
CPC ...... G06F 16/122; G06F 16/21; G06F 16/285; G06F 8/60; G06F 8/70; G06F 9/445

USPC .......................................................... 707/802
See application file for complete search history.

(56) References Cited

U.S. PATENT DOCUMENTS

| | | |
|---|---|---|
| 7,124,148 B2 | 10/2006 | Sauermann |
| 7,222,308 B2 | 5/2007 | Sauermann et al. |
| 7,231,387 B2 | 6/2007 | Sauermann et al. |
| 7,257,599 B2 | 8/2007 | Sauermann et al. |
| 7,310,719 B2 | 12/2007 | Von Bergen et al. |
| 7,337,295 B2 | 2/2008 | Von Bergen et al. |
| 7,373,340 B2 | 5/2008 | Sauermann et al. |
| 7,403,495 B2 | 7/2008 | Sauermann |
| 7,415,458 B2 | 8/2008 | Sauermann |
| 7,447,987 B2 | 11/2008 | Sauermann |

(Continued)

OTHER PUBLICATIONS

U.S. Appl. No. 15/824,041, Bregler et al., filed Nov. 28, 2017.

(Continued)

*Primary Examiner* — Hosain T Alam
*Assistant Examiner* — Nicholas E Allen
(74) *Attorney, Agent, or Firm* — Fish & Richardson P.C.

(57) ABSTRACT

A container group is created using a database deployment infrastructure (DI) administrator (HA). API privileges for the container group are granted, using the HA, to a container group administrator (GA). API privileges for a container created in the container group using the GA are granted, using the GA, to a container administrator (CA). API privileges for the container are granted, using the CA, to a container developer (CD). Schema privileges for the container are granted, using the CA, to a container consumer (CC). API privileges for the container group are revoked, using the HA, from the GA. The container group is dropped using the HA.

20 Claims, 9 Drawing Sheets

(56) References Cited

U.S. PATENT DOCUMENTS

| | | |
|---|---|---|
| 7,454,454 B2 | 11/2008 | Sauermann |
| 7,487,165 B2 | 2/2009 | Sauermann et al. |
| 7,574,676 B2 | 8/2009 | Sauermann |
| 7,590,683 B2 | 9/2009 | Bergen et al. |
| 7,610,582 B2 | 10/2009 | Becker et al. |
| 7,647,592 B2 | 1/2010 | Sauermann |
| 7,653,452 B2 | 1/2010 | Sauermann et al. |
| 7,664,858 B2 | 2/2010 | Sauermann |
| 7,665,030 B2 | 2/2010 | Sauermann et al. |
| 7,685,510 B2 | 3/2010 | Sauermann |
| 7,725,900 B2 | 5/2010 | Sauermann |
| 7,730,053 B2 | 6/2010 | Sauermann |
| 7,752,628 B2 | 7/2010 | Sauermann |
| 7,797,286 B2 | 9/2010 | Sauermann |
| 7,873,666 B2 | 1/2011 | Sauermann |
| 7,900,155 B2 | 3/2011 | Sauermann |
| 8,074,206 B2 | 12/2011 | Sauermann et al. |
| 8,078,985 B2 | 12/2011 | Sauermann |
| 8,108,798 B2 | 1/2012 | Sauermann |
| 8,171,422 B2 | 5/2012 | Sauermann |
| 8,203,972 B2 | 6/2012 | Sauermann |
| 8,224,938 B2 | 7/2012 | Sauermann |
| 8,510,710 B2 | 8/2013 | Harren et al. |
| 8,601,025 B1 | 12/2013 | Shajenko et al. |
| 8,621,385 B2 | 12/2013 | Sauermann et al. |
| 9,026,525 B2 | 5/2015 | Harren et al. |
| 9,026,857 B2 | 5/2015 | Becker et al. |
| 9,047,105 B2 | 6/2015 | Kinder et al. |
| 9,069,832 B2 | 6/2015 | Becker et al. |
| 9,411,707 B1 | 8/2016 | Hale et al. |
| 9,600,269 B1 | 3/2017 | Bregler et al. |
| 9,704,168 B2 | 7/2017 | Chauhan et al. |
| 10,657,114 B2 | 5/2020 | Bregler et al. |
| 10,674,438 B2 | 6/2020 | Bregler et al. |
| 10,776,330 B2 | 9/2020 | Bregler et al. |
| 2004/0122865 A1 | 6/2004 | Stahl et al. |
| 2004/0220893 A1 | 11/2004 | Spivack et al. |
| 2005/0044110 A1 | 2/2005 | Herzenberg et al. |
| 2005/0055331 A1 | 3/2005 | Sauermann et al. |
| 2006/0005017 A1 | 1/2006 | Black et al. |
| 2006/0179058 A1 | 8/2006 | Bram et al. |
| 2008/0040367 A1 | 2/2008 | Bitonti et al. |
| 2008/0046462 A1 | 2/2008 | Kaufman et al. |
| 2009/0043796 A1 | 2/2009 | Sauermann |
| 2009/0265314 A1 | 10/2009 | Kindsvogel et al. |
| 2010/0082549 A1* | 4/2010 | Hollingsworth ...... G06F 16/252 707/665 |
| 2011/0054266 A1 | 3/2011 | Dhino et al. |
| 2013/0031165 A1 | 1/2013 | Pantos et al. |
| 2014/0215385 A1 | 7/2014 | Sauermann |
| 2015/0106736 A1* | 4/2015 | Torman ................... G06F 16/13 715/745 |
| 2016/0072817 A1* | 3/2016 | Makhervaks ....... H04L 63/0236 726/3 |
| 2016/0085841 A1* | 3/2016 | Dorfman ................. G06F 9/468 707/738 |
| 2016/0094681 A1 | 3/2016 | Wu |
| 2016/0179850 A1 | 6/2016 | Martin et al. |
| 2016/0182315 A1* | 6/2016 | Salokanto ........... H04L 41/5054 709/226 |
| 2016/0182327 A1 | 6/2016 | Coleman et al. |
| 2016/0294881 A1* | 10/2016 | Hua ........................ H04L 63/20 |
| 2016/0378518 A1* | 12/2016 | Antony ................. G06F 9/4856 718/1 |
| 2017/0147311 A1* | 5/2017 | Bregler ................... G06F 16/25 |
| 2017/0147333 A1 | 5/2017 | Bregler et al. |
| 2017/0177892 A1* | 6/2017 | Tingstrom .............. G06F 16/22 |
| 2017/0286526 A1 | 10/2017 | Bar-Or et al. |
| 2017/0315882 A1 | 11/2017 | Yammine |
| 2017/0322991 A1 | 11/2017 | Tran et al. |
| 2017/0323112 A1 | 11/2017 | Tran et al. |
| 2018/0062956 A1 | 3/2018 | Schultz et al. |
| 2018/0095739 A1 | 4/2018 | Baset et al. |
| 2018/0097725 A1 | 4/2018 | Wood et al. |
| 2019/0005074 A1 | 1/2019 | Bregler et al. |
| 2019/0005108 A1 | 1/2019 | Bregler et al. |
| 2019/0007895 A1 | 1/2019 | Bregler et al. |
| 2019/0163772 A1 | 5/2019 | Bregler et al. |

OTHER PUBLICATIONS

Non-Final Office Action issued in U.S. Appl. No. 15/637,698 dated Mar. 7, 2019, 12 pages.
Non-Final Office Action issued in U.S. Appl. No. 15/637,554 dated Jun. 7, 2019, 15 pages.
Non-final office action issued in U.S. Appl. No. 15/637,698 dated Aug. 26, 2019, 14 pages.
Final office action issued in U.S. Appl. No. 15/637,554 dated Oct. 21, 2019, 16 pages.
Non-final office action issued in U.S. Appl. No. 15/637,554 dated Jan. 24, 2020, 16 pages.
Non-final office action issued in U.S. Appl. No. 15/637,601 dated May 7, 2020, 41 pages.
Kheir et al., "Cost evaluation for intrusion response using dependency graphs." 2009 International Conference on Network and Service Security. IEEE, 2009, 6 pages.
Mavlyutov et al., "Dependency-Driven Analytics: A Compass for Uncharted Data Oceans." CIDR 2017, 9 pages.
Final Office Action issued in U.S. Appl. No. 15/637,601 dated Oct. 20, 2020, 18 pages.

* cited by examiner

| Container API | Container Group API | Central Container Management API (_SYS_DI) |
|---|---|---|
| | | CONFIGURE_DI |
| | | CONFIGURE_DI_PARAMETERS |
| | | LIST_LIBRARIES |
| | | |
| | | CREATE_CONTAINER_GROUP |
| | | DROP_CONTAINER_GROUP |
| | | MOVE_CONTAINER_TO_GROUP |
| | | |
| | GRANT_CONTAINER_GROUP_API_PRIVILEGES | GRANT_CONTAINER_GROUP_API_PRIVILEGES* |
| | GRANT_CONTAINER_GROUP_API_PRIVILEGES_WITH_GRANT_OPTION | GRANT_CONTAINER_GROUP_API_PRIVILEGES_WITH_GRANT_OPTION* |
| | REVOKE_CONTAINER_GROUP_API_PRIVILEGES | REVOKE_CONTAINER_GROUP_API_PRIVILEGES* |
| | | |
| | CREATE_CONTAINER | CREATE_CONTAINER |
| | DROP_CONTAINER | DROP_CONTAINER |
| | EXPORT_CONTAINER_FOR_SUPPORT | ESPORT_CONTAINER_FOR_SUPPORT |
| | IMPORT_CONTAINER_FOR_SUPPORT | IMPORT_CONTAINER_FOR_SUPPORT |
| | GRANT_CONTAINER_SUPPORT_PRIVILEGE | GRANT_CONTAINER_SUPPORT_PRIVILEGE |
| | REVOKE_CONTAINER_SUPPORT_PRIVILEGE | REVOKE_CONTAINER_SUPPORT_PRIVILEGE |
| | | |
| GRANT_CONTAINER_API_PRIVILEGES | GRANT_CONTAINER_API_PRIVILEGES | GRANT_CONTAINER_API_PRIVILEGES |
| GRANT_CONTAINER_API_PRIVILEGES_WITH_GRANT_OPTION | GRANT_CONTAINER_API_PRIVILEGES_WITH_GRANT_OPTION | GRANT_CONTAINER_API_PRIVILEGES_WITH_GRANT_OPTION |
| REVOKE_CONTAINER_API_PRIVILEGES | REVOKE_CONTAINER_API_PRIVILEGES | REVOKE_CONTAINER_API_PRIVILEGES |
| CONFIGURE_CONTAINER | CONFIGURE_CONTAINER | CONFIGURE_CONTAINER |
| CONFIGURE_CONTAINER_PARAMETERS | CONFIGURE_CONTAINER_PARAMETERS | CONFIGURE_CONTAINER_PARAMETERS |
| CONFIGURE_LIBRARIES | CONFIGURE_LIBRARIES | CONFIGURE_LIBRARIES |
| LIST_CONFIGURED_LIBRARIES | LIST_CONFIGURED_LIBRARIES | LIST_CONFIGURED_LIBRARIES |
| GRANT_CONTAINER_SCHEMA_PRIVILEGES | GRANT_CONTAINER_SCHEMA_PRIVILEGES | GRANT_CONTAINER_SCHEMA_PRIVILEGES |
| REVOKE_CONTAINER_SCHEMA_PRIVILEGES | REVOKE_CONTAINER_SCHEMA_PRIVILEGES | REVOKE_CONTAINER_SCHEMA_PRIVILEGES |
| GRANT_CONTAINER_SCHEMA_ROLES | GRANT_CONTAINER_SCHEMA_ROLES | GRANT_CONTAINER_SCHEMA_ROLES |
| REVOKE_CONTAINER_SCHEMA_ROLES | REVOKE_CONTAINER_SCHEMA_ROLES | REVOKE_CONTAINER_SCHEMA_ROLES |
| CANCEL | CANCEL | CANCEL |
| | | |
| WRITE | | |
| DELETE | | |
| READ | | |
| READ_DEPLOYED | | |
| LIST | | |
| LIST_DEPLOYED | | |
| STATUS | | |
| MAKE | | |
| MAKE_ASYNC | | |
| GET_DEPENDENCIES | | |
| GET_MAKE_GROUPS | | |

*API can be called for any container group

FIG. 4

DATABASE-LEVEL CONTAINER GROUP MANAGEMENT

CROSS REFERENCE TO RELATED APPLICATIONS

This application is related to and filed in conjunction with U.S. patent application Ser. No. 15/637,554, filed on Jun. 29, 2017, entitled "OPTIMIZED RE-DEPLOYMENT OF DATABASE ARTIFACTS"; which is also related to and filed in conjunction with U.S. patent application Ser. No. 15/637,601, filed on Jun. 29, 2017, entitled "DEPLOYMENT OF INDEPENDENT DATABASE ARTIFACT GROUPS", which is also related to and filed in conjunction with U.S. patent application Ser. No. 15/637,698, filed on Jun. 29, 2017, entitled "RESTRICTING ACCESS TO EXTERNAL SCHEMAS FROM WITHIN A DATABASE LEVEL CONTAINER BY WHITELISTING ALLOWED SCHEMAS", the entire contents of each application and together are hereby incorporated by reference.

BACKGROUND

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure ("HANA DI" or "HDI") is a service layer of the HANA database that simplifies the deployment of HANA database objects by providing a declarative approach for defining database objects (as design-time artifacts) and ensuring a consistent deployment into the database, based on a transactional all-or-nothing deployment model and implicit dependency management. The HANA DI is focused only on deployment aspects and addresses both development and modeling scenarios as part of the HANA database.

In current implementations, database containers are isolated against each other by database means and the management of different database containers is currently handled by a single API in a central database schema. This configuration can be problematic if it is desired that a particular set of database containers should be exclusively managed by a different administrative user.

SUMMARY

The present disclosure describes database-level container group management.

In an implementation, a container group is created using a database deployment infrastructure (DI) administrator (HA). API privileges for the container group are granted, using the HA, to a container group administrator (GA). API privileges for a container created in the container group using the GA are granted, using the GA, to a container administrator (CA). API privileges for the container are granted, using the CA, to a container developer (CD). Schema privileges for the container are granted, using the CA, to a container consumer (CC). API privileges for the container group are revoked, using the HA, from the GA. The container group is dropped using the HA.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, explicit administrative users are established to manage independent sets of database containers (that is, not a container user or a database administrator). Second, different (and more than one) administrative user can be established to manage an independent set of database containers. Third, administrative containers can be grouped for ease of access. Fourth, administration of each group can be isolated with respect to other groups. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 4 is a table illustrating example Application Programming Interface (API) functionality relative to containers, container groups, and a central container management API with respect to container groups, according to an implementation.

FIGS. 5A-1 and 5A-2 illustrate a flowchart of an example method for managing database-level container groups, according to an implementation.

FIGS. 5B-1 and 5B-2 illustrate a flowchart of another example method for managing database-level container groups, according to an implementation.

Like reference numbers and designations in the various drawings indicate like elements.

DETAILED DESCRIPTION

Figure 1:
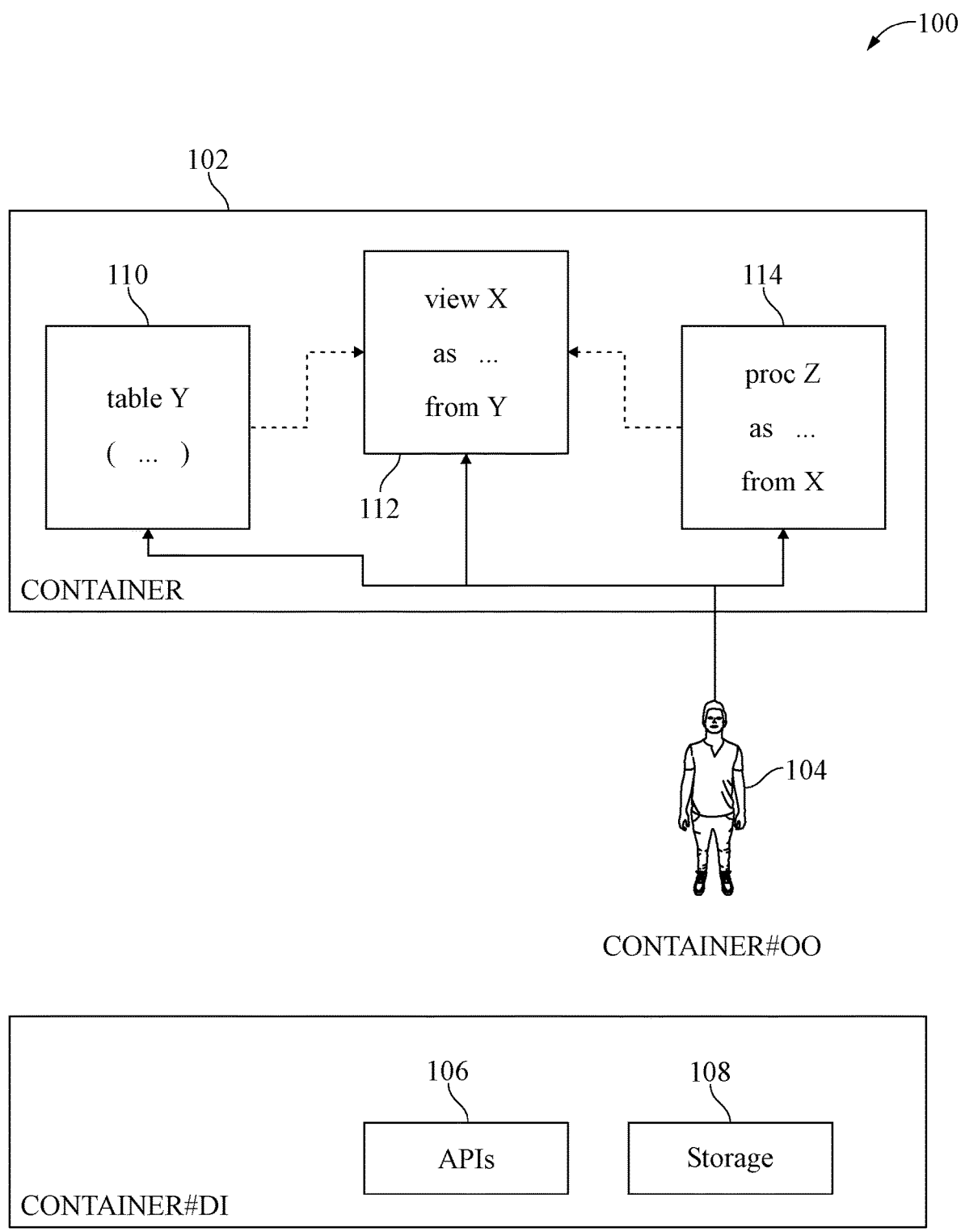
FIG. 1 is a block diagram illustrating an example SAP HANA database container ("container") model, according to an implementation.

The following detailed description describes database-level container group management, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

For purposes of understanding, this disclosure is focused on discussion of the described methodology and subject matter with respect to the SAP HANA in-memory database platform. However, the described methodology and subject matter is also applicable to conventional- and hybrid-type database platforms, and discussion related to the SAP HANA platform is not meant to limit the disclosure or scope of the described subject matter in any way, or to limit applicability to other database platforms.

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure (HANA DI) is a service layer on top of the HANA database that simplifies the deployment of HANA database objects by providing a declarative approach for defining a database object (as a design-time database artifact (or "artifact")) and ensuring a consistent deployment into the database, based on a transactional all-or-nothing deployment model and implicit dependency management. In typical implementations, for creating, modifying, and deleting objects inside the database, HANA DI uses SQL commands. HANA DI is configured to run inside its own process as part of a HANA database cluster (for example, one process per logical database).

HANA DI is focused only on deployment/re-deployment aspects and addresses both development and modeling scenarios as part of the HANA database. In typical implementations, non-deployment aspects (for example, version control and lifecycle management) are not handled by HANA DI, but in both the cloud and on premise as part of overall development and deployment architecture and infrastructure. As will be appreciated by those of ordinary skill in the art, in some implementations, the HANA DI can be configured to implement, manage, trigger, or execute some or all non-deployment aspects.

Deployment of database objects using HANA DI is based on a container model where each container corresponds to a database schema. Containers can be used for multiple deployments of the same database artifacts and for other uses (for example, development sandboxes). Containers are isolated against each other by database means (for example, each database schema with its deployed database objects is owned by a per-schema technical database user). By default, a cross-container access at the database level is not possible; but, can be granted using database privileges. To allow deployment of the same database objects into different containers, database objects need to be written in a schema-free way (that is, not using explicit schema references).

The HANA DI makes use of and considers technical users, (for example, a technical deployment user for a specific schema-based container) for security aspects of HANA DI deployment. Deployment-related activities (for example, staging of files and triggering real deployment into a single container) are typically performed by a dedicated technical deployment user. Therefore, a fine-grained security control on the level of files or HANA DI build plugins is not required, because the technical deployment user is required to have full control in an appropriate container. In typical implementations, the owner of a container schema is configured to be different than the technical deployment user to allow for separation of privileges for deployment and runtime access to deployed database objects. In the case of a development or modeling scenario, fine-grained security control is performed by the development infrastructure.

In typical implementations, HANA DI provides artifacts for HANA database objects (for example, tables, views, calculation views, procedures, and core data services (CDS)). Non-database artifacts (for example, JAVASCRIPT programs and Open Data Protocol (ODATA)) are handled by application containers.

In typical implementations, a single deployment only operates on a single schema-based container. If multiple schemata are involved, then multiple deployments using HANA DI are required (that is, one deployment for each schema). Here, the container boundary acts as a deployment boundary (for example, affected database objects inside other database schemata are not re-deployed and deployment does not fail if database objects inside other schemata break). In addition to schema-based containers, the HANA DI also uses database schemata to isolate its metadata (for example, to separate storage of file-based artifacts from deployed database objects).

The HANA DI provides infrastructure for all deployment aspects. The interpretation of artifacts is performed by HANA DI build plugins with access to a deployment container using a SQL-based Application Programming Interface (API). In this way, all commands needed by the build plugins are configured take database security constraints into account and to be available at the SQL layer of HANA. At a lower-level and in typical implementations, to be exposed to the design-time world using the HANA DI, SQL commands must be configured to support transactional deployment where DDL and DML, statements are run inside a single database transaction in non-auto-commit mode.

FIG. 1 is a block diagram illustrating an example SAP HANA database container model 100, according to an implementation. The container model 100 includes a container 102, technical user 104, and container-model-associated deployment infrastructure management elements (a deployment API 106 and a storage schema 108).

Container 102 is considered equivalent to a database schema. Container 102 is illustrated with an example database table 110, database view 112, and database procedure 114 as part of the associated database schema. Technical user 104 is configured as object owner of the database table 110, database view 112, and database procedure 114. For example, technical user 104 could be considered a technical deployment user for the container 102. In this role, technical user 104 could have privileges to deploy the database table 110, database view 112, and database procedure 114 within the database schema associated with the container 102, but lack privileges for runtime access to these database objects.

Build plugins have access to the container through a non-public process-internal API. The internal API is used for querying and updating information in the container and the database during the deployment process. The internal API issues SQL commands to the database for this purpose on behalf of the build plugins. This configuration acts as an additional security mechanism that prevents build plugins from freely executing arbitrary SQL commands. The SQL-based deployment API 106 is used by administrators and developers (or an application or tool acting in that role) of a container. The storage schema 108 allows for isolation of metadata (for example, separating storage of file artifacts from deployed database objects).

The HANA DI exposes two types of APIs: 1) a higher-level privileged container management API that allows administration (for example, creation and deletion) of schema-based containers and 2) a container-level deployment API that allows applications or lifecycle management tools to DEPLOY/UNDEPLOY artifacts within a container. Although containers are isolated against each other by database means, the management of different containers is currently handled by a single API in a central database schema (for example, a HANA DI database object owner _ SYS_DI). This configuration can be problematic if it is desired that a particular set of containers should be exclusively managed by a different administrative user. For example, different services on top of the database may need to be able to manage their own, isolated set of containers in order to not interfere with the containers of other services, which could compromise the data integrity and security of these services.

Figure 2:
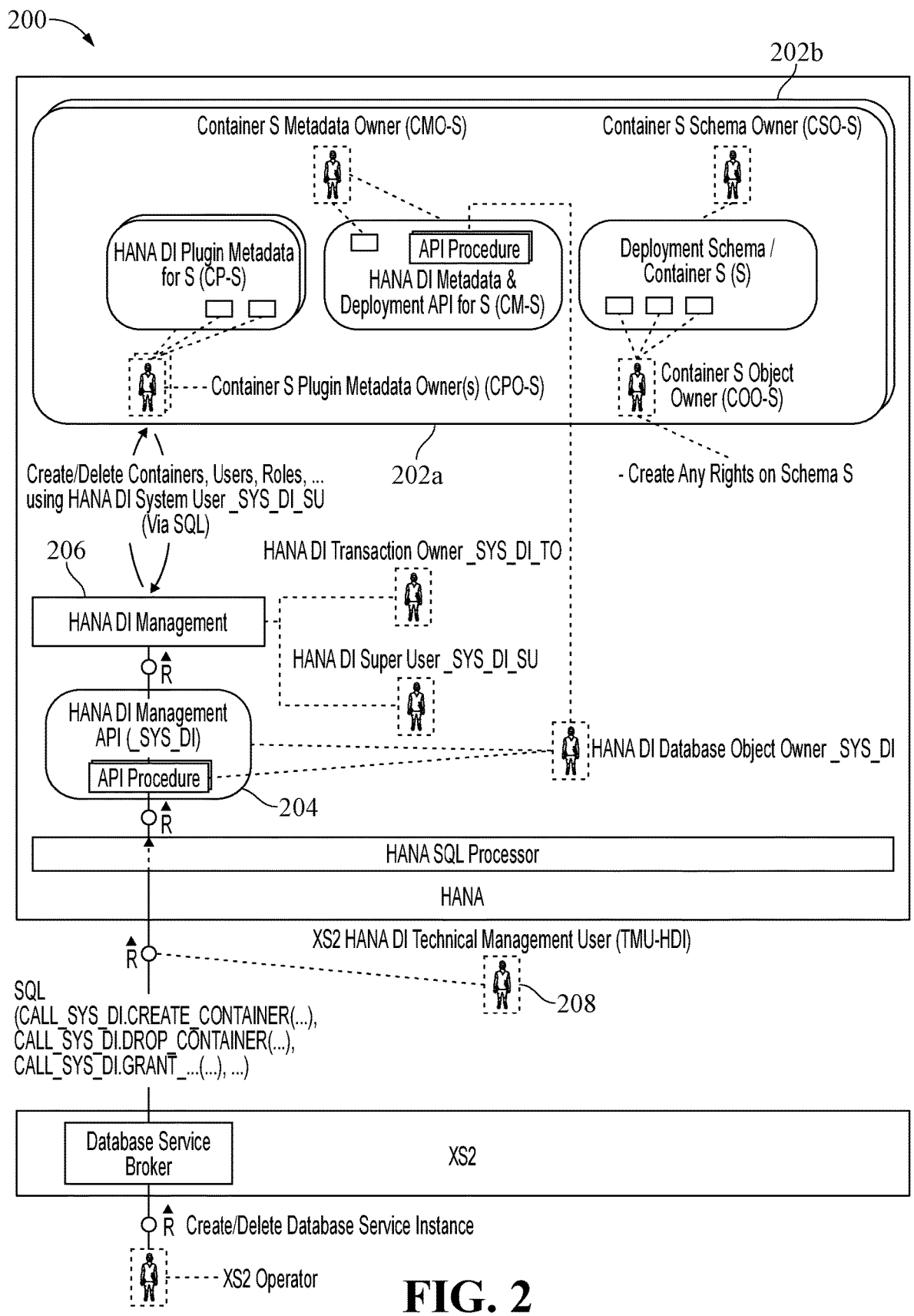
FIG. 2 is a block diagram illustrating a current HANA Deployment Infrastructure (DI) Administration and Container Group Management model, according to an implementation.

FIG. 2 is a block diagram illustrating a current HANA DI Administration and Container Group Management model 200, according to an implementation. As illustrated, each container 202a/202b (for example, each a container 102 as in FIG. 1) is managed by the single HANA DI Management API 204 accessing HANA DI management functions 206. HANA DI Management 206 can be seen as an entity that performs the logic behind the HANA DI Management API 204. As illustrated, each container 202a/202b (for example, each a container 102 as in FIG. 1) is managed by HANA DI management logic 206 that can be controlled by the single HANA DI Management API 204. A Technical Management User 208 or other database users that have received the privileges to call the HANA DI Management API 204 can send management requests to the HANA DI Management API 204. This configuration prevents a particular set of containers to be exclusively managed by a different administrative user. However, it would be useful to permit this management functionality.

Figure 3:
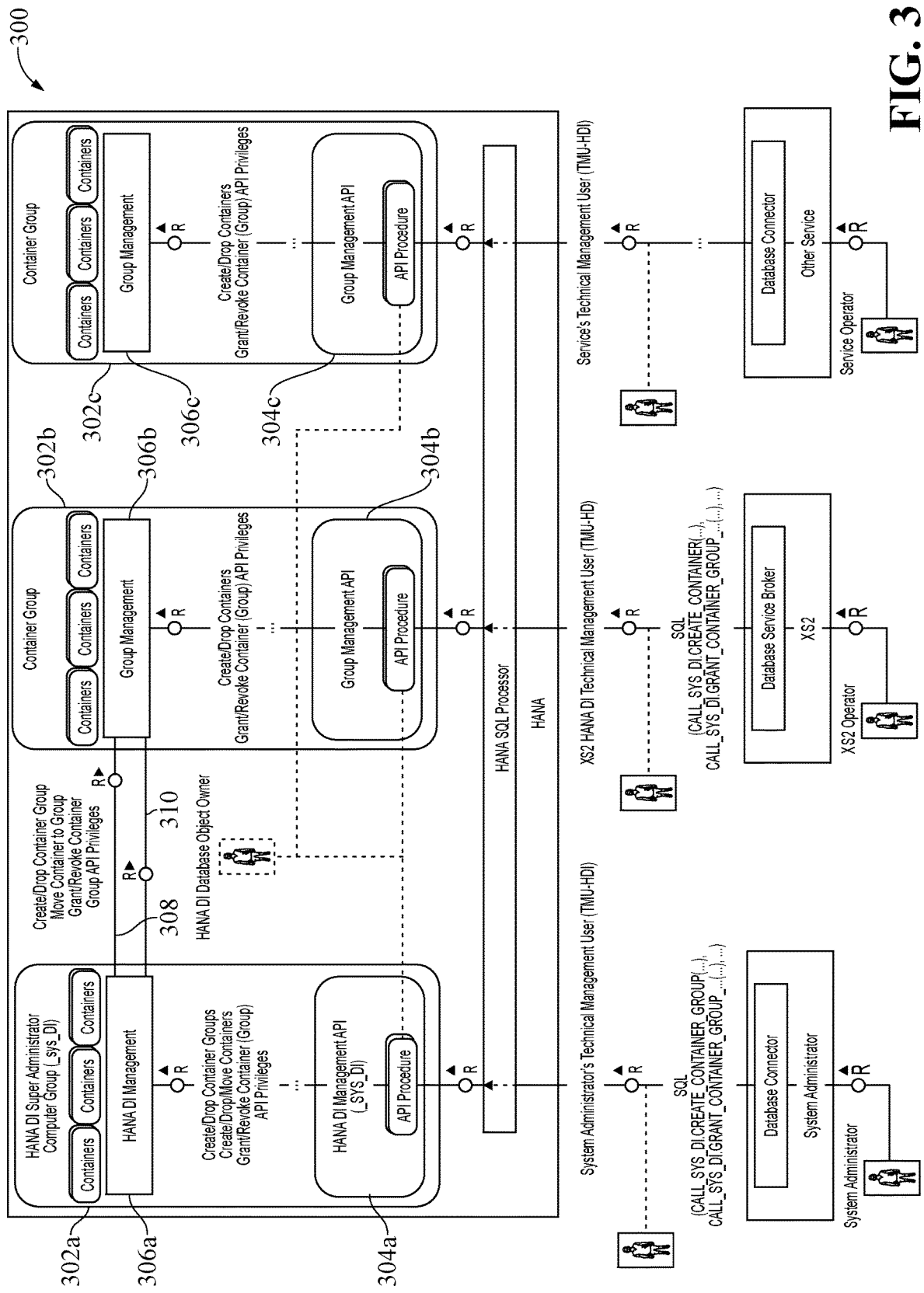
FIG. 3 is a block diagram illustrating an enhanced HANA DI Administration and Container Group Management model, according to an implementation.

FIG. 3 is a block diagram illustrating an enhanced HANA DI Administration and Container Group Management model 300, according to an implementation. Model 300 illustrates a configuration permitting designation of different groups of database-level containers (or "container groups") and a separate administration for each different container group to isolate access to containers within a particular container group from other container groups. Each container group corresponds to a database schema which encapsulates all administrative APIs for managing the container group. A container group is considered an additional database schema containing APIs to manage a set of containers. In typical implementations, containers are associated with their own database schemas and are not physically located in a container group's database schema. In FIG. 3, container groups are designated as 302a, 302b, and 302c.

Container groups also introduce a new set of APIs to the HANA DI for performing administrative management tasks on an exclusive set of containers. In FIG. 3, administrative APIs are designated as 304a, 304b, and 304c, and correspond to container groups 302a, 302b, and 302c, respectively, for purposes of management tasks. Administrative APIs 304a, 304b, and 304c access HANA DI management functions 306a, 306b, and 306c, respectively, at the container group level.

In typical implementations and as illustrated in model 300, a container can only be a member of a single container group at any time. The administrator of a container group is not permitted to perform administrative tasks for containers in a different container group, unless such privileges are specifically granted to that administrator. This means that containers can be grouped and the groups managed independently from other groups.

On creation of a container group (for example, container group G), the HANA DI creates a new container group management API schema (for example, API Schema GS), which is owned by the HANA DI Database Object Owner (for example, _SYS_DI). In typical implementations, the container group name G follows a similar naming scheme as that of a container name. The name of the container group's schema GS typically follows the naming scheme _ SYS_DI#G. As an example, a container group "GROUP NAME" will have the schema name _SYS_DI#GROUP NAME.

APIs for working with a specific container group G are created as database procedures inside the container group management API schema GS. These database procedures are created as definer mode procedures and are owned by a HANA DI database object owner (for example, _SYS_DI). Their definition essentially consists of a delegation to a corresponding internal procedure in the database while binding the container group name, for example:

```
PROCEDURE GS.CREATE_CONTAINER(a, b, c, d, e) ...
BEGIN
    -- Bind container group name to 'G' and call internal procedure
SYS.CREATE_CONTAINER_DEV
    SYS.CREATE_CONTAINER_DEV('G', a, b, c, d, e);
END.
```

Execution rights for the container group management API for schema GS needs to be explicitly granted after creation of the container group (for example, using:
_SYS_DI.GRANT_CONTAINER_
GROUP_API_PRIVILEGES(_WITH GRANT OPTION).

In some implementations, the container group schema GS also contains database views that allow a container group administrator to monitor the state of a container group G:
M_CONTAINERS: Shows which containers are currently managed by the container group G and when they were created by a certain user,
M_CONTAINER_SCHEMAS: Lists the schema names used by all of the containers in the container group G, and
M_CONTAINER_VERSIONS: Shows the version of all containers in the container group G and when the containers were created.

A container group has the same API procedures as the original implementation of the central container management API of _SYS_DI. Additionally, there are new APIs for managing privileges for the container group API that are used to allow other users to administer a container group:
GRANT_CONTAINER_GROUP_API_PRIVILEGES
(_WITH_GRANT_OPTION): Grants the given privileges on API objects of a container group to a principal (with grant option), and REVOKE_CONTAINER_GROUP_API_PRIVILEGES: Revokes the API privileges from a principal.

Note that the container management schema associated with container group 302a (that is, a central container management schema _SYS_DI) can be considered a special type of container group as it offers the same APIs as container group 302b and 302c but with differences that effectively make it a super-administrator for managing all container groups and their associated administrators (for example, using requests 308 and 310 from HANA DI Management API 304a/HANA DI Management 306a). Administrative API 304a for granting or revoking API privileges for a container group can be executed for the _SYS_DI container group but also for any other container group. This functionality is configured to grant administrators of a container group the necessary privileges to perform administrative tasks with the API of that particular container group.

Additionally, the central container management schema _SYS_DI offers APIs for creating and dropping container groups as well as moving a container from one container group to another:

CREATE_CONTAINER_GROUP: Creates a container group with the given name,

DROP_CONTAINER_GROUP: Drops the container group with the given name. The group can only be dropped, if there are no containers in the group. Alternatively, the container group can be dropped and its remaining containers moved to the central management group _SYS_DI by using the move_containers_to_default_group parameter, and MOVE_CONTAINER_TO_GROUP: Move the container with the given name to the container group of the given name.

Containers in the _SYS_DI group are supposed to be of a temporary nature for administrative purposes only, like preparing them for a move to another container group.

Monitoring views of a container group are also present in the central container management schema _SYS_DI. These are complemented by additional super-administrator views. For example:

M_CONTAINER_GROUPS: Lists all of the HANA DI container groups, their creation user, and creation date.

M_ALL_CONTAINERS, M_ALL_CONTAINER_SCHEMAS, and M_ALL_CONTAINER_VERSIONS: These views are similar to versions without the "_ALL" interfix, but show the corresponding information for containers in all container groups.

FIG. 4 is a table 400 illustrating example API functionality relative to containers, container groups, and a central container management API with respect to container groups, according to an implementation. As illustrated, table 400 lists example API functions for containers 402, container groups 404, and a central container management API 406. Functions related to API 404 are all new relative to existing functionality (for example, as described in FIG. 2) due to the addition of container groups in the new model 300 (as described in FIG. 3). There is some crossover of the functions associated with the container group API 404 and functions associated with the central container management API 406 due to the need to administer the new container groups. As illustrated, example API functions 408 are newly added to the central container management API 406.

Figures 1, 5A:
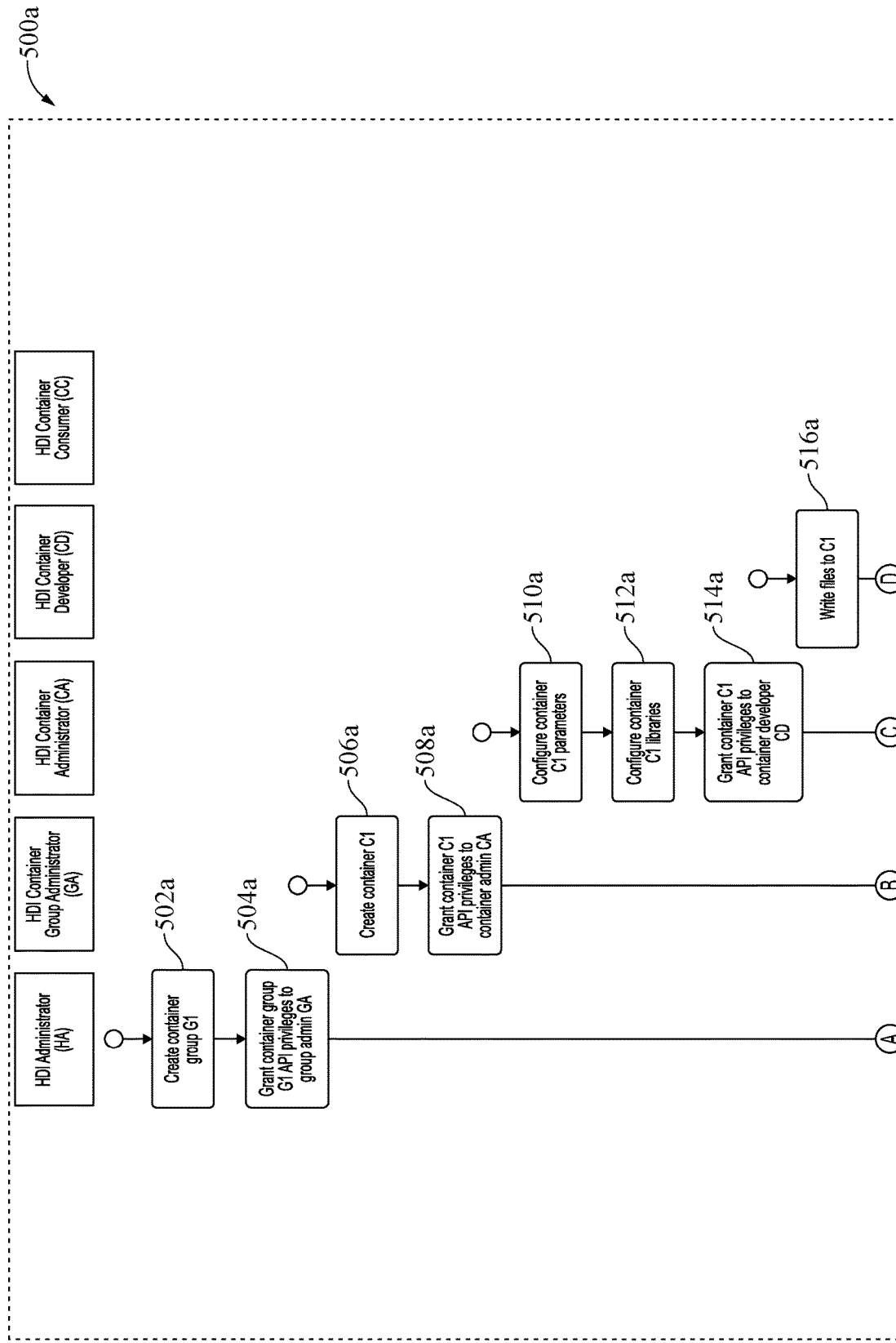
Figures 2, 5A:
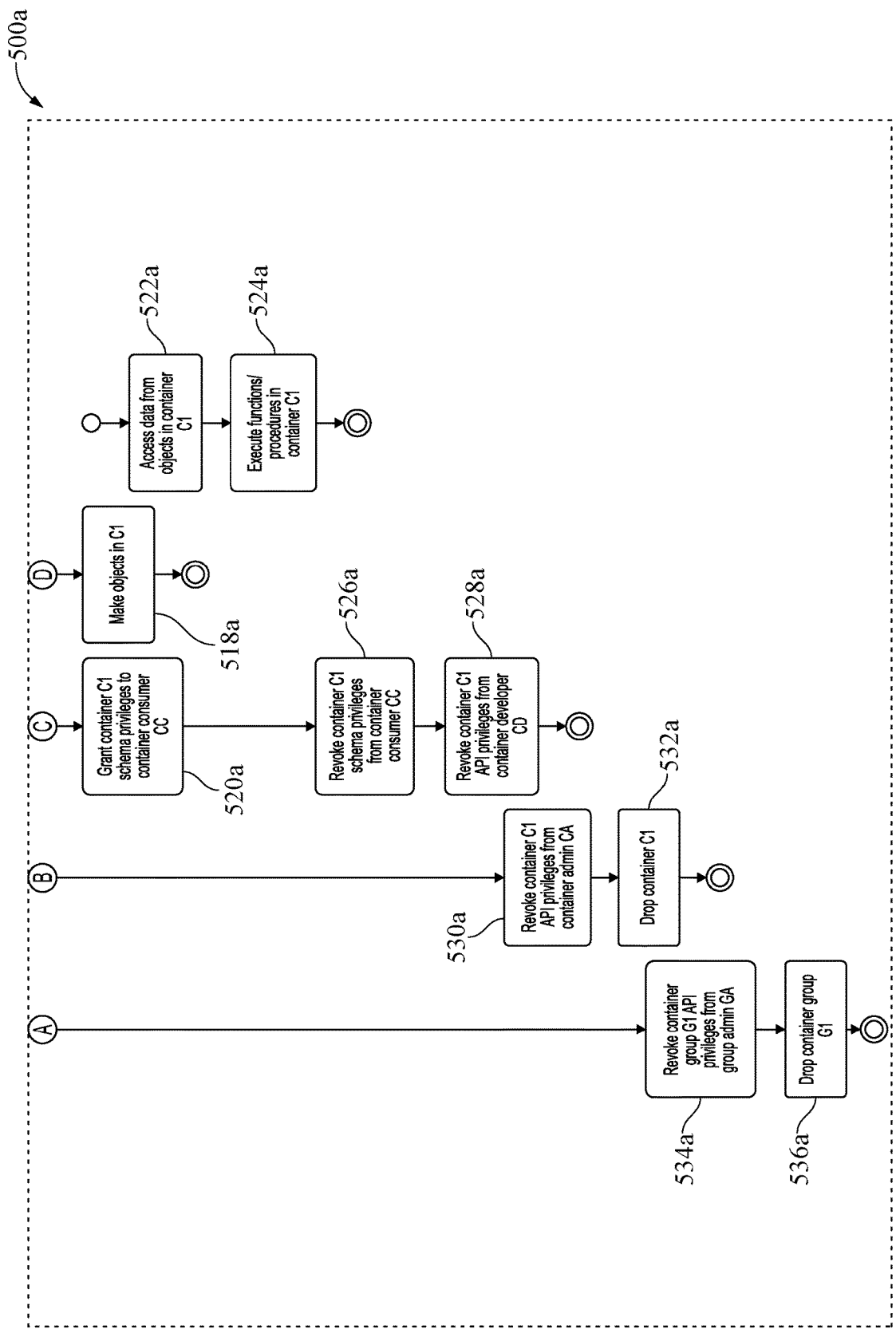

FIGS. 5A-1 and 5A-2 illustrate a flowchart of an example method 500a for managing database-level container groups, according to an implementation. For clarity of presentation, the description that follows generally describes method 500a in the context of the other figures in this description. However, it will be understood that method 500a may be performed, for example, by any suitable system, environment, software, and hardware, or a combination of systems, environments, software, and hardware, as appropriate. In some implementations, various steps of method 500a can be run in parallel, in combination, in loops, or in any order. At a high-level, method 500a is an example of an HDI Administrator (HA) creating a container group and corresponding HDI Container Group Administrator (GA). The GA creates a container and a corresponding HDI Container Administrator (CA). The CA sets up a HDI Container Developer (CD) and a HDI Container Consumer. The CD and CC use the container. Cleanup is performed at the end of the operations.

At 502a in FIG. 5A-1, the HA creates a container group G1. From 502a, method 500a proceeds to 504a.

At 504a, the HA grants container group G1 API privileges to the GA. From 504a, method 500a proceeds to 506a.

At 506a, the GA creates a container C1. From 506a, method 500a proceeds to 508a.

At 508a, the GA grants container C1 API privileges to the CA. From 508a, method 500a proceeds to 510a.

At 510a, the CA configures container C1 parameters. From 510a, method 500a proceeds to 512a.

At 512a, the CA configures container C1 libraries. From 512a, method 500a proceeds to 514a.

At 514a, the CA grants container C1 API privileges to the CD. From 514a, method 500a proceeds to 516a.

At 516a, the CD writes files to the container C1. From 516a, method 500a proceeds to 518a on FIG. 5A-2.

At 518a, the CD makes objects in the container C1. From 518a, method 500a proceeds to 520a.

At 520a, the CA grants container C1 schema privileges to the CC. From 520a, method 500a proceeds to 522a.

At 522a, the CC accesses data from objects in the container C1. From 522a, method 500a proceeds to 524a.

At 524a, the CC executes functions/procedures in the container C1. From 524a, method 500a proceeds to 526a.

At 526a, the CA revokes the container C1 schema privileges for the CC. From 526a, method 500a proceeds to 528a.

At 528a, the CA revokes the container C1 API privileges for the CD. From 528a, method 500a proceeds to 530a.

At 530a, the GA revokes the container C1 API privileges for the CA. From 530a, method 500a proceeds to 532a.

At 532a, the GA drops the container C1. From 532a, method 500a proceeds to 534a.

At 534a, the HA revokes the container group G1 API privileges for the GA.

From 534a, method 500a proceeds to 536a.

At 536a, the HA drops the container group G1. After 536a, method 500a stops.

Figures 1, 5B:
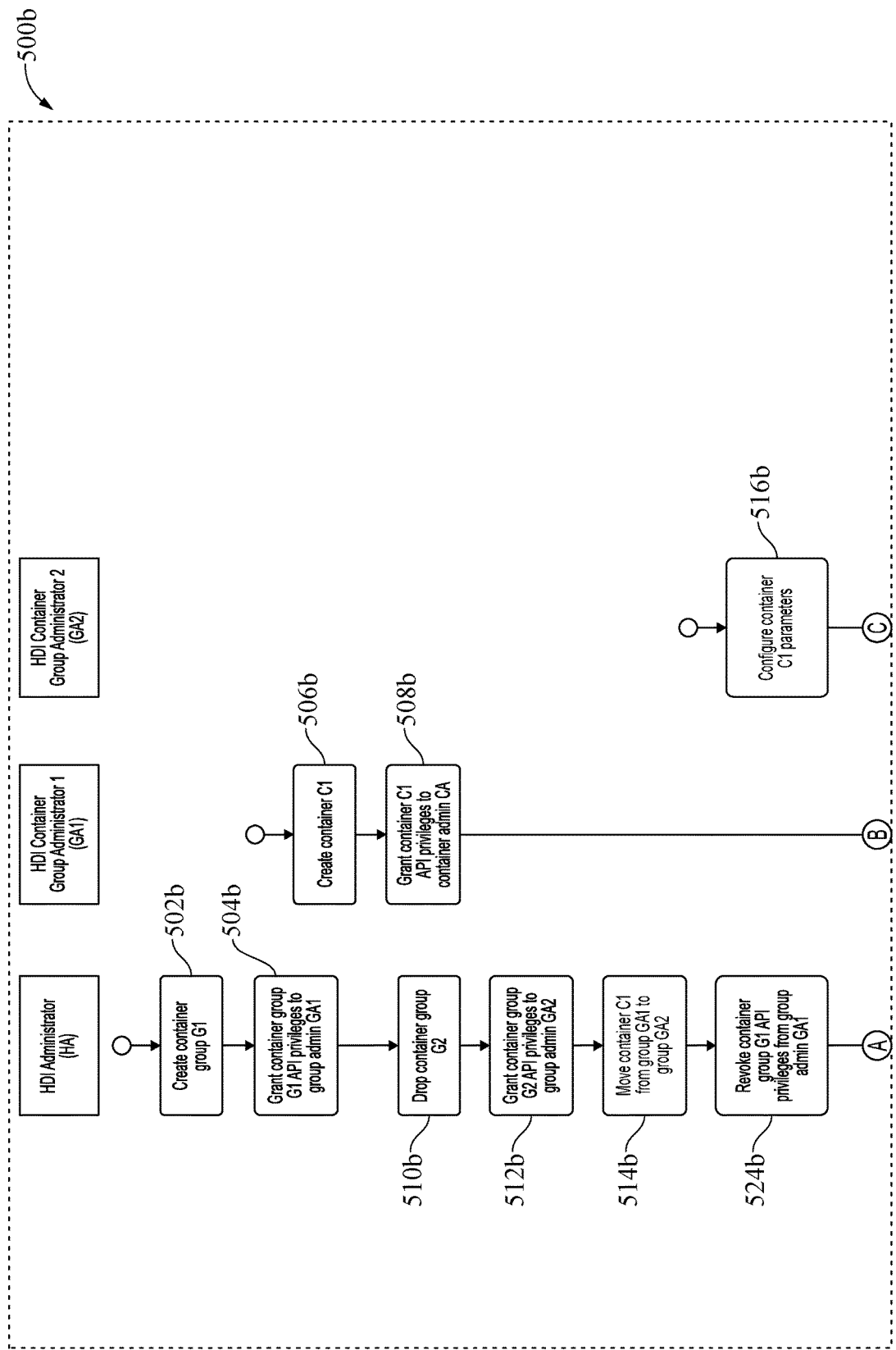
Figures 2, 5B:
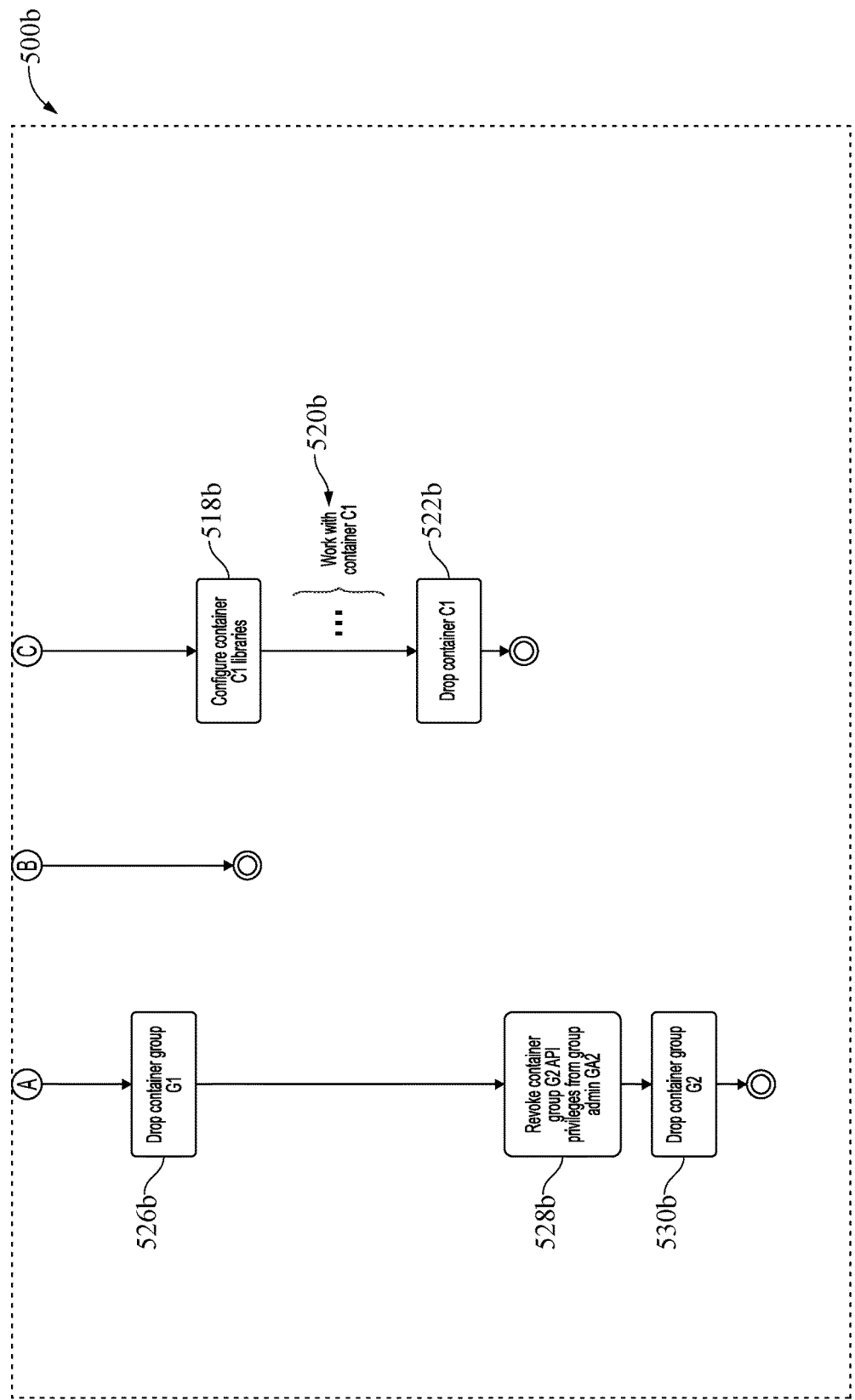

FIGS. 5B-1 and 5B-2 illustrate a flowchart of another example method 500b for managing database-level container groups, according to an implementation. For clarity of presentation, the description that follows generally describes method 500b in the context of the other figures in this description. However, it will be understood that method 500b may be performed, for example, by any suitable system, environment, software, and hardware, or a combination of systems, environments, software, and hardware, as appropriate. In some implementations, various steps of method 500b can be run in parallel, in combination, in loops, or in any order. At a high level, method 500b is an example of using an HDI Administrator (HA) to create two container groups and moving a container between the two container groups. Cleanup is performed at the end of the operations.

At 502b in FIG. 5B-1, the HA creates a first container group G1. From 502b, method 500b proceeds to 504b.

At 504b, the HA grants container group G1 API privileges to a first GA (GA1). From 504b, method 500b proceeds to 506b.

At 506b, the GA1 creates a container C1. From 506b, method 500b proceeds to 508b.

At 508b, the GA1 grants container C1 API privileges to a CA (not illustrated). From 508b, method 500b proceeds to 510b.

At 510b, the HA creates a second container group G2. From 510b, method 500b proceeds to 512b.

At 512b, the HA grants container group G2 API privileges to a second GA (GA2). From 512b, method 500b proceeds to 514b.

At 514b, the HA moves container C1 from container group GA1 to GA2. From 514b, method 500b proceeds to 516b.

At 516b, the GA2 configures container C1 parameters. From 516b, method 500b proceeds to 518b on FIG. 5B-2.

At 518b, the GA2 configures container C1 libraries. From 518b, method 500b proceeds to 520b.

At 520b, the GA2 works with the container C1. From 520b, method 500b proceeds to 522b.

At 522b, the GA2 drops the container C1. From 522b, method 500b proceeds back to 524b on FIG. 5B-1.

At 524b, the HA revokes the container group G1 API privileges for the GA1.

From 524b, method 500b proceeds to 526b on FIG. 5B-2.

At 526b, the HA drops the container group G1. From 526b, method 500b proceeds to 528b.

At 528b, the HA revokes the container group G2 API privileges for the GA2.

From 528a, method 500b proceeds to 530b.

At 530b, the HA drops the container group G2. After 530b, method 500b stops.

Figure 6:
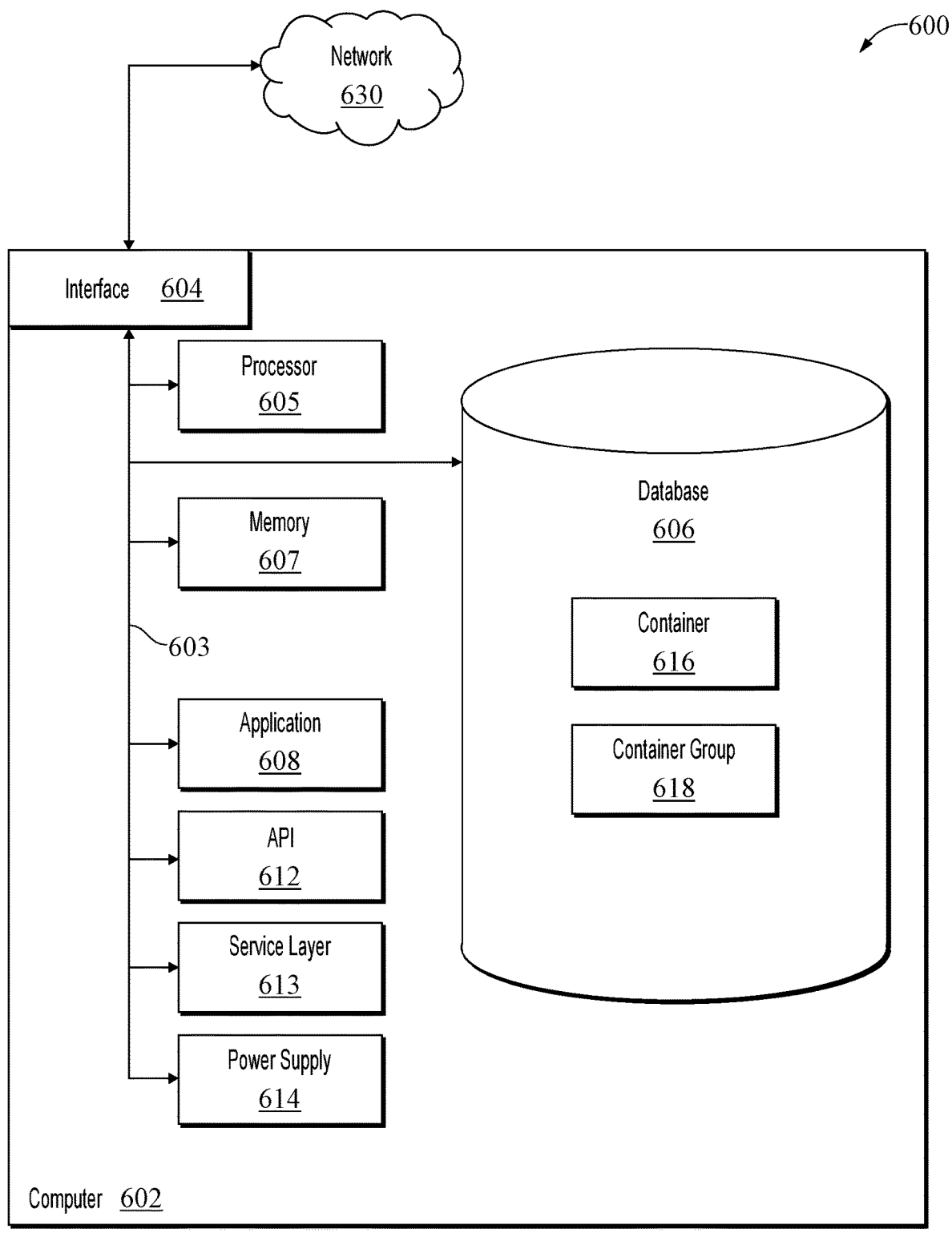
FIG. 6 is a block diagram of an example computer system used to provide computational functionalities associated with described algorithms, methods, functions, processes, flows, and procedures, as described in the instant disclosure, according to an implementation.

FIG. 6 is a block diagram of an example computer system 600 used to provide computational functionalities associated with described algorithms, methods, functions, processes, flows, and procedures, as described in the instant disclosure, according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or other server (or a combination of servers).

The computer 602 can receive requests over network 630 from a client application (for example, executing on another computer 602) and respond to the received requests by processing the received requests using an appropriate software application(s). In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, hardware or software (or a combination of both hardware and software), may interface with each other or the interface 604 (or a combination of both), over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. For example, as illustrated, the database 606 holds instances of previously described containers 616 and container groups 618.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like, storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or other power management functionality). In some implementations, the power-supply 614 can include a power plug to allow the computer 602 to be plugged into a wall socket or other power source to, for example, power the computer 602 or recharge a rechargeable battery.

There may be any number of computers 602 associated with, or external to, a computer system containing computer 602, each computer 602 communicating over network 630. Further, the term "client," "user," and other appropriate terminology may be used interchangeably, as appropriate, without departing from the scope of this disclosure. Moreover, this disclosure contemplates that many users may use one computer 602, or that one user may use multiple computers 602.

Described implementations of the subject matter can include one or more features, alone or in combination.

For example, in a first implementation, a computer-implemented method, comprising: creating a container group using a database deployment infrastructure (DI) administrator (HA); granting, using the HA, API privileges for the container group to a container group administrator (GA); granting, using the GA, API privileges to a container administrator (CA) for a container created in the container group using the GA; granting, using the CA, API privileges for the container to a container developer (CD); granting, using the CA, schema privileges for the container to a container consumer (CC); revoking, using the HA, API privileges for the container group from the GA; and dropping, using the HA, the container group.

The foregoing and other described implementations can each, optionally, include one or more of the following features:

A first feature, combinable with any of the following features, further comprising: configuring, using the CA, container parameters for the container; and configuring, using the CA, container libraries for the container.

A second feature, combinable with any of the previous or following features, further comprising: writing, using the CD, filed to the container; and making, using the CD, objects in the container.

A third feature, combinable with any of the previous or following features, further comprising: accessing, using the CC, data from objects in the container; and executing, using the CC, functions or procedures in the container.

A fourth feature, combinable with any of the previous or following features, further comprising: revoking, using the CA, schema privileges for the container from the CC; and revoking, using the CA, container API privileges from the CD.

A fifth feature, combinable with any of the previous or following features, further comprising revoking, using the GA, API privileges for the container from the CA.

A sixth feature, combinable with any of the previous or following features, further comprising dropping, using the GA, the container.

In a second implementation, a non-transitory, computer-readable medium storing one or more instructions executable by a computer system to perform operations comprising: creating a container group using a database deployment infrastructure (DI) administrator (HA); granting, using the HA, API privileges for the container group to a container group administrator (GA); granting, using the GA, API privileges to a container administrator (CA) for a container created in the container group using the GA; granting, using the CA, API privileges for the container to a container developer (CD); granting, using the CA, schema privileges for the container to a container consumer (CC); revoking, using the HA, API privileges for the container group from the GA; and dropping, using the HA, the container group.

The foregoing and other described implementations can each, optionally, include one or more of the following features:

A first feature, combinable with any of the following features, further comprising one or more instructions to: configure, using the CA, container parameters for the container; and configure, using the CA, container libraries for the container.

A second feature, combinable with any of the previous or following features, further comprising one or more instructions to: write, using the CD, filed to the container; and make, using the CD, objects in the container.

A third feature, combinable with any of the previous or following features, further comprising one or more instructions to: access, using the CC, data from objects in the container; and execute, using the CC, functions or procedures in the container.

A fourth feature, combinable with any of the previous or following features, further comprising one or more instructions to: revoke, using the CA, schema privileges for the container from the CC; and revoke, using the CA, container API privileges from the CD.

A fifth feature, combinable with any of the previous or following features, further comprising one or more instructions to revoke, using the GA, API privileges for the container from the CA.

A sixth feature, combinable with any of the previous or following features, further comprising one or more instructions to drop, using the GA, the container.

In a third implementation, A computer-implemented system, comprising: a computer memory; and a hardware processor interoperably coupled using the computer memory and configured to perform operations comprising: creating a container group using a database deployment infrastructure (DI) administrator (HA); granting, using the HA, API privileges for the container group to a container group administrator (GA); granting, using the GA, API privileges to a container administrator (CA) for a container created in the container group using the GA; granting, using the CA, API privileges for the container to a container developer (CD); granting, using the CA, schema privileges for the container to a container consumer (CC); revoking, using the HA, API privileges for the container group from the GA; and dropping, using the HA, the container group.

The foregoing and other described implementations can each, optionally, include one or more of the following features:

A first feature, combinable with any of the following features, further comprising one or more instructions to: configure, using the CA, container parameters for the container; and configure, using the CA, container libraries for the container.

A second feature, combinable with any of the previous or following features, further configured to: write, using the CD, filed to the container; and make, using the CD, objects in the container.

A third feature, combinable with any of the previous or following features, further configured to: access, using the CC, data from objects in the container; and execute, using the CC, functions or procedures in the container.

A fourth feature, combinable with any of the previous or following features, further configured to: revoke, using the CA, schema privileges for the container from the CC; and revoke, using the CA, container API privileges from the CD.

A fifth feature, combinable with any of the previous or following features, further configured to revoke, using the GA, API privileges for the container from the CA.

A sixth feature, combinable with any of the previous or following features, further configured to drop, using the GA, the container.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    creating a container group using a database deployment infrastructure (DDI) administrator (DDIA), wherein the DDI is a service layer of a database, and wherein the container group comprises application programming interfaces (APIs) for performing administrative management tasks on an exclusive set of containers within the container group and isolates access to the exclusive set of containers from other container groups;
    granting, using the DDIA, API privileges for the container group to a container group administrator (GA);
    granting, using the GA, API privileges to a container administrator (CA) for a container created in the container group using the GA;
    granting, using the CA, API privileges for the container to a container developer (CD);
    granting, using the CA, schema privileges for the container to a container consumer (CC);
    revoking, using the DDIA, the API privileges for the container group from the GA; and
    dropping, using the DDIA, the container group.

2. The computer-implemented method of claim 1, further comprising:
    configuring, using the CA, container parameters for the container; and
    configuring, using the CA, container libraries for the container.

3. The computer-implemented method of claim 1, further comprising:
    writing, using the CD, files to the container; and
    making, using the CD, objects in the container.

4. The computer-implemented method of claim 1, further comprising:
    accessing, using the CC, data from objects in the container; and
    executing, using the CC, functions or procedures in the container.

5. The computer-implemented method of claim 1, further comprising:
    revoking, using the CA, the schema privileges for the container from the CC; and
    revoking, using the CA, the API privileges for the container from the CD.

6. The computer-implemented method of claim 1, further comprising revoking, using the GA, the API privileges for the container from the CA.

7. The computer-implemented method of claim 1, further comprising dropping, using the GA, the container.

8. A non-transitory, computer-readable medium storing one or more instructions executable by a computer system to perform operations comprising:
    creating a container group using a database deployment infrastructure (DDI) administrator (DDIA), wherein the DDI is a service layer of a database, and wherein the container group comprises application programming interfaces (APIs) for performing administrative management tasks on an exclusive set of containers within the container group and isolates access to the exclusive set of containers from other container groups;
    granting, using the DDIA, API privileges for the container group to a container group administrator (GA);
    granting, using the GA, API privileges to a container administrator (CA) for a container created in the container group using the GA;
    granting, using the CA, API privileges for the container to a container developer (CD);
    granting, using the CA, schema privileges for the container to a container consumer (CC);
    revoking, using the DDIA, the API privileges for the container group from the GA; and
    dropping, using the DDIA, the container group.

9. The non-transitory, computer-readable medium of claim 8, further comprising one or more instructions to:
configure, using the CA, container parameters for the container; and
configure, using the CA, container libraries for the container.

10. The non-transitory, computer-readable medium of claim 8, further comprising one or more instructions to:
write, using the CD, files to the container; and
make, using the CD, objects in the container.

11. The non-transitory, computer-readable medium of claim 8, further comprising one or more instructions to:
access, using the CC, data from objects in the container; and
execute, using the CC, functions or procedures in the container.

12. The non-transitory, computer-readable medium of claim 8, further comprising one or more instructions to:
revoke, using the CA, the schema privileges for the container from the CC; and
revoke, using the CA, the API privileges for the container from the CD.

13. The non-transitory, computer-readable medium of claim 8, further comprising one or more instructions to revoke, using the GA, the API privileges for the container from the CA.

14. The non-transitory, computer-readable medium of claim 8, further comprising one or more instructions to drop, using the GA, the container.

15. A computer-implemented system, comprising:
a computer memory; and
a hardware processor interoperably coupled using the computer memory and configured to perform operations comprising:
creating a container group using a database deployment infrastructure (DDI) administrator (DDIA), wherein the DDI is a service layer of a database, and wherein the container group comprises application programming interfaces (APIs) for performing administrative management tasks on an exclusive set of containers within the container group and isolates access to the exclusive set of containers from other container groups;
granting, using the DDIA, API privileges for the container group to a container group administrator (GA);
granting, using the GA, API privileges to a container administrator (CA) for a container created in the container group using the GA;
granting, using the CA, API privileges for the container to a container developer (CD);
granting, using the CA, schema privileges for the container to a container consumer (CC);
revoking, using the DDIA, the API privileges for the container group from the GA; and
dropping, using the DDIA, the container group.

16. The computer-implemented system of claim 15, further comprising one or more instructions to:
configure, using the CA, container parameters for the container; and
configure, using the CA, container libraries for the container.

17. The computer-implemented system of claim 15, further configured to:
write, using the CD, files to the container; and
make, using the CD, objects in the container.

18. The computer-implemented system of claim 15, further configured to:
access, using the CC, data from objects in the container; and
execute, using the CC, functions or procedures in the container.

19. The computer-implemented system of claim 15, further configured to:
revoke, using the CA, the schema privileges for the container from the CC; and
revoke, using the CA, the API privileges for the container from the CD.

20. The computer-implemented system of claim 15, further configured to:
revoke, using the GA, the API privileges for the container from the CA; and
drop, using the GA, the container.

* * * * *